United States Statutory Invention Registration [19]

[11] Reg. Number: H340

MacKenzie et al. [43] Published: Oct. 6, 1987

[54] LOW MASS DIFFUSION BONDING TOOLS

[75] Inventors: Wallace R. MacKenzie, Quartz Hill; Donald M. Fraser, Los Angeles, both of Calif.

[73] Assignee: The United States of America as represented by the Secretary of the Air Force, Washington, D.C.

[21] Appl. No.: 832,114

[22] Filed: Feb. 24, 1986

[51] Int. Cl.[4] ..... B23K 37/00
[52] U.S. Cl. ..... 228/44.3
[58] Field of Search ..... 228/44.3, 243, 185, 228/189, 143; 164/411

[56] References Cited

U.S. PATENT DOCUMENTS

| | | | |
|---|---|---|---|
| 3,071,853 | 1/1963 | Price . | |
| 3,093,104 | 6/1963 | Bukata | 228/443 |
| 3,350,078 | 10/1967 | Schultz | 228/44.3 |
| 3,444,608 | 12/1966 | Conn | 228/243 |
| 3,550,254 | 12/1920 | Greenspan | 228/243 |
| 3,590,466 | 4/1969 | Moshammer | 228/243 |
| 3,936,920 | 2/1976 | Conn | 228/189 |
| 4,013,210 | 3/1977 | Deminet | 228/193 |
| 4,117,970 | 9/1978 | Hamilton | 228/193 |

FOREIGN PATENT DOCUMENTS

| | | | |
|---|---|---|---|
| 0081979 | 5/1982 | Japan | 228/189 |

*Primary Examiner*—Harold J. Tudor
*Attorney, Agent, or Firm*—Gerald B. Hollins; Donald J. Singer

[57] ABSTRACT

Diffusion bonding spacer block tooling or mandrels having low physical mass and low thermal mass and specially adapted to the fabrication of airframe component elements such as titanium structures. Alternate uses for the disclosed structure and a plurality of spacer block example configurations and preferred stainless steel mandrel material are included, along with a sequence for using the disclosed spacer blocks.

14 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW MASS DIFFUSION BONDING TOOLS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of tooling spacer blocks or mandrels enabling fabrication of complex structures from individual component elements using diffusion bonding and similar element integrating techniques.

In the fabrication of sandwich-type structures, elements of layered cross-section, and devices of wedge shaped cross-section in one or more coordinate planes, it is often desirable to employ diffusion bonding element joining or integrating techniques. Diffusion bonded structures have found particular acceptance in the fabrication of state-of-the-art airframes, particularly when such airframes employ titanium as a fabrication material. The wing pivot bearing bosses and other highly stressed wing elements in the B-1 military aircraft, for example, have been found particularly amenable to fabrication from titanium and titanium alloy metals. The desirable strength-to-weight ratio and high corrosion resistance provided by titanium and titanium alloys is found to be particularly desirable in fabricating such aircraft structural assemblies.

Diffusion bonding as employed in the fabrication of these structural assemblies involves the application of heat and mutual force to the component elements being bonded with the heat and force environment continuing through periods of 10 hours or more in many instances. Since diffusion bonded structures can have overall dimensions measured in feet or tens of feet, the equipment used in performing diffusion bond operations is frequently massive in nature and requiring of considerable operating energy and generated forces.

Diffusion bonding equipment usually includes an assortment of spacing blocks or tooling fixtures used for both maintaining the elements of a to-be-bonded structure in correct relative position and for limiting deformation of the elements while in a pressured, elevated temperature environment, and a plastic flow state. Heretofore this tooling has been of a solid or homogeneous nature.

The weight and handling problems associated with homogeneous or solid tooling of such size can be appreciated to add considerably to the effort involved in fabricating a diffusion bonded structure. A homogeneous solid tooling block three feet long by four inches thick by three inches wide could be expected to weigh in the order of 120 lbs. for example, and to additionally require mechanical placement equipment and careful handling in order that neither the elements being bonded nor the tooling spacer blocks be damaged during placement. Nick and ding damage to such blocks, for example, would be transferred to subsequent diffusion bonded workpieces during a diffusion bond plastic flow interval.

The patent art includes several examples of diffusion bonding and other arrangements for joining materials using heat and pressure to achieve an atomic bonding between elements of the joined structure. In particular, the patent of G. L. Hitz, U.S. Pat. No. 2,998,646, discloses an apparatus and method for achieving high temperature and high pressure welding of two metal tube elements. The patent of W. V. Wenger, U.S. Pat. No. 3,114,202, illustrates a method for welding a hollow aluminum article using heat and pressure rollers. The patent of J. Melill et al., U.S. Pat. No. 3,533,153, illustrates a method for achieving diffusion bonds in a sandwich structure through the use of spacer bars or mandrels and also uses these tools in a stainless steel fabricated structure.

The patent of N. Klimmek et al., U.S. Pat. No. 3,533,156, shows use of tapered, solid or homogeneous mandrels for achieving a diffusion bonded structure. The Klimmek patent also indicates the feasibility of diffusion bonding with a variety of metals including aluminum, stainless steel, titanium, nickel, tantalum, molybdenum, zirconium, and columbium and their alloys. The Klimmek et al. patent also recites a list of prior patents involving solid state or intermolecular diffusion bonding.

The patent of D. E. Houston et al., U.S. Pat. No. 4,204,628, provides an additional example of the diffusion bonding of metal parts, especially parts made from copper.

The above-identified patent references indicate the use of diffusion bonding to be advantageous in the fabrication of strong, lighweight structures and also indicates the continued use of solid homogeneous tooling in the practice of diffusion bonding. The advantages of the present alternate to this solid homogeneous tooling will become apparent in the following description.

SUMMARY OF THE INVENTION

An object of the present invention is to provide tooling fixtures or spacer blocks of improved low mass design for use with diffusion bonding and related attachment techniques.

Another object of the invention is to provide diffusion bonding spacer blocks having low thermal inertia.

Another object of the invention is to provide diffusion bonding tooling fixtures of decreased cost and increased handling convenience.

Another object of the invention is to provide diffusion bonding spacer blocks which can be fabricated without complex and costly machining or casting operations.

Another object of the invention is to provide diffusion bonding spacer blocks which can be used without significant influence on the heating patterns and temperature gradients occurring in a diffusion bonded part during temperature cycling portions of the bonding sequence.

Another object of the invention is to provide diffusion bonding filler blocks which are compatible with the metallurgical properties of the titanium and titanium alloys used in the aircraft and space vehicle arts.

Another object of the invention is to provide fabrication spacer blocks which afford reasonable and accommodatable dimensional changes in the presence of temperature change.

Another object of the invention is to provide diffusion bonding filler blocks which are capable of easy fabrication in a variety of sizes and shapes.

Additional objects and features of the invention will be understood from the following description and the accompanying drawings.

These and other objects of the invention are achieved by diffusion bond tooling for holding intersecting planar structure elements in predetermined juxtapose in the presence of bonding heat and force, and involving a plurality of tool element planar members of predetermined size and shape disposed in polyhedral relationship about a hollow interior cavity, means connecting the tool element planar members into a substantially closed integral geometric polyhedron having a planar member face disposable adjacent each desired planar structural element bonded locus, structure means located within the hollow interior cavity and connected with a plurality of the tool element planar members for resisting distortion of the polyhedron by the bonding heat and force.

BRIEF DESCRIPTION OF THE DRAWINGS

FIG. 3 shows tooling fixture spacer blocks according to the invention disposed among a plurality of workpiece elements prior to a diffusion bond heating sequence.

FIG. 4 shows a sandwich structure formable with diffusion bonding techniques, together with a cutaway representation of a tooling spacer block, made in accordance with the invention, used in performing diffusion bonding.

DETAILED DESCRIPTION

The long time durations, large forces, and elevated temperatures involved in performing a diffusion bonding operation necessitate the presence of tooling spacer blocks or filler blocks or mandrels or more simply, spacer blocks, for use in retaining the bondable component elements in predetermined desired relative positions while the diffusion bond atomic interlocking is accomplished. The spacer blocks used in diffusion bonding and related fabrication techniques have historically been of the solid and homogeneous structure type, despite the disadvantages of cost, weight, energy consumption, and handling difficulty associated with blocks of this type. The tooling spacer block shown in exploded form in FIG. 1 is a desirable alternative of this solid homogeneous form of spacer block.

Figure 1:
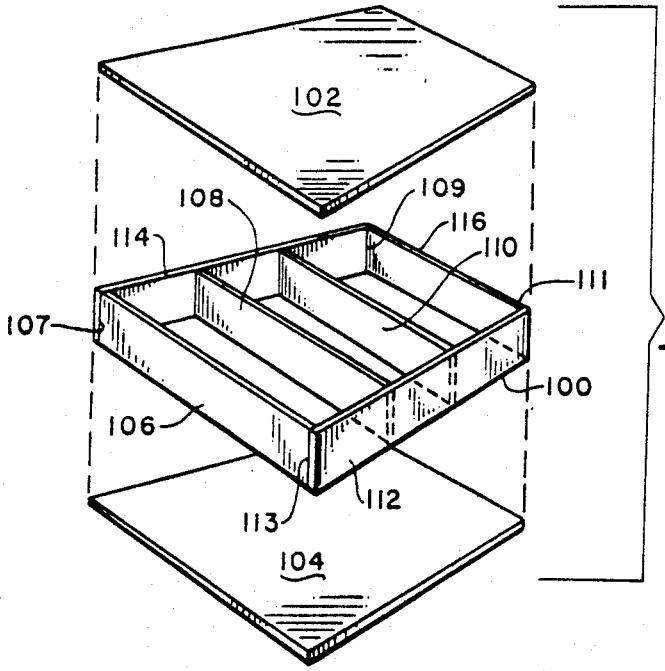
FIG. 1 is an exploded view of a diffusion bonding tool spacer block made in accordance with the invention.

The FIG. 1 spacer block is in the form of polyhedron, a six-sided structure being shown in FIG. 1, including a circumferential or peripheral frame member 100 having a number of frame components 106, 112, 114, and 116 connecting at frame member joints 107, 109, 111 and 113. The frame member 100 may be considered for descriptive purposes to enclose a cavity and to be vertical standing and laterally disposed over a horizontal plane lying generally in the direction of the bottom and top spacer block cover plates 104 and 102. Tooling spacer blocks of the type shown in FIG. 1 are often called mandrels in the diffusion bonding art; several of the above recited patents, for example, use the name mandrel for their disclosed solid homogeneous spacer blocks.

In order to limit deflection of the bottom and top cover plate members 104 and 102 in FIG. 1 and thereby the distortion of diffusion bonded workpiece structure by the force applied to the component elements during the diffusion bonding sequence, intermediate support members such as the support members 108 and 110 are employed within the cavity defined by the circumferential frame member 100. The number and location of these support members can be selected according to the expected pressure loads on the FIG. 1 spacer block apparatus during diffusion bonding and according to the thickness of the cover plate members 104 and 102 and in accordance with well known strength of materials calculations. For larger spacer blocks or spacer blocks having an unusually large ratio of lateral surface area to cover plate thickness, a large number of support members 108 and 110 and support members running in multiple directions within the frame member defined cavity can be used.

Support members 108 and 110 are of course, helpful in maintaining both the vertical and horizontal dimensions of the FIG. 1 spacer block. For spacer block structures of low profile or small vertical surface area to large horizontal surface area proportion, the principal assistance provided by support members of the 108 and 110 type is of course, in improving the ability of the spacer block to withstand vertically oriented forces.

Concerning the choice of materials for fabricating spacer blocks of the type shown in FIG. 1, the material used in a spacer block is first order dependent on the type of material to be used in the workpiece structure, and also on the temperatures and pressures used in the bonding sequence and other considerations—including cost. It is, as a minimum, desirable for the spacer block material to have a plastic flow temperature above that of the workpiece materials in order that the spacer block have usable strength at the diffusion bonding temperatures. For use in the fabrication of airframe structures where titanium is a popular diffusion bonded material, stainless steel is desirable for fabricating a spacer block; stainless steel of the type known in the trade as 22–4–9 alloy is a preferred form of such stainless steel. The stainless steel alloy identified as Type 321 stainless can also be used for structures of the FIG. 1 type. The Type 321 alloy is especially desirable for use with boron nitride workpiece structures.

Welding including the tungsten inert gas, TIG, of welding is preferred as a means of integrating the spacer block elements showin in the FIG. 1 exploded view into a unitary structure. Welding can be used at each of the circumferential or peripheral frame member joints 107, 109, 111, and 113, and also as a means for holding the support members 108 and 110 in desired positions. A combination of cavity interior and exterior welds is preferred for holding the bottom and top cover plate members 104 and 102 in integral relationship with the side frame member 100. Cavity interior welds can be accomplished in the FIG. 1 structure through delayed incorporation of one or more of the frame member components 106, 112, 114, and 116 until the desired amount of internal welding of peripheral frame members, bottom and top cover plate, and support members has been accomplished, and then using external welds only for fastening this one or more final frame member into position. Machine screws or other attaching arrangements could also be used for holding this final frame member component in position where an insufficient degree of welding length is presented in the spacer block design.

The spacer block arrangement shown in FIG. 1 clearly represents an improvement over the solid homogeneous mandrel blocks heretofore used in fabricating diffusion bonded workpieces. Depending upon the relative size and shape of the FIG. 1 spacer block, the cavity space defined by the peripheral frame member 100 and the bottom and top cover plate members 104 and 102 represent "saved" spacer block fabrication material, i.e., stainless steel, which is not required for satisfactory diffusion bonding and which contributes unnecessarily to the weight and thermal mass of the FIG. 1 structure.

Thermal mass of a diffusion bonding spacer block merits consideration in block design since the intimate relationship of the spacer block with the workpiece elements being bonded assures that bonding temperatures prevail throughout the spacer block and workpiece combination. Heating of the spacer block structure, in addition to being an unnecessary expenditure of heat energy in achieving the diffusion bonding, also delays attainment of the desired temperatures throughout the diffusion bonded workpiece. Delayed temperature attainment can allow progression of the diffusion bonding process at undesirable non-uniform rates—according to the thermal mass of the spacer block being heated or conversely, can prolong the diffusion bonding time non-uniformly during cooldown of the workpiece and spacer block.

The heat capacity of the FIG. 1 type spacer blocks and the ability of such structures to conduct heat uniformly between all of the spacer block polyhedral surfaces can be altered within some limits by introducing heat conducting media into the cavity space of the FIG. 1 structure if needed. Since the cavity space in FIG. 1 is preferably completely closed and isolated, dry nitrogen, air, mercury, ammonia, or other media of selected thermal properties may be permanently confined within this cavity after cavity sealing has been achieved. With metal components of ordinary size, however, heat conductivity through such cavity retained media will be of minor consequences in the diffusion bonding process.

Although the FIG. 1 apparatus has thus far been described in terms of utility in the performance of diffusion bonding of metal elements into an integral workpiece, it should be realized that the concepts involved are not limited to either the use of metal workpiece elements or metal elements for the FIG. 1 spacer block structure. Diffusion bonding-like workpiece element integrations can also be achieved with plastic materials such as nylon, polyethylene, polypropylene, or materials in the acrylic group or other non-metallic materials known in the art. Spacer blocks of the type herein described can also be used in achieving workpiece structures that are held together by adhesive, epoxy, or other such integrating media. The curing temperatures for such integrating media can be elevated above ambient but are usually lower than the range contemplated for diffusion bonding. For workpiece elements composed of plastic the FIG. 1 spacer block can be fabricated of metals or non-metal materials in addition to the preferred stainless steel material found desirable for use with titanium workpiece elements.

Figure 2:
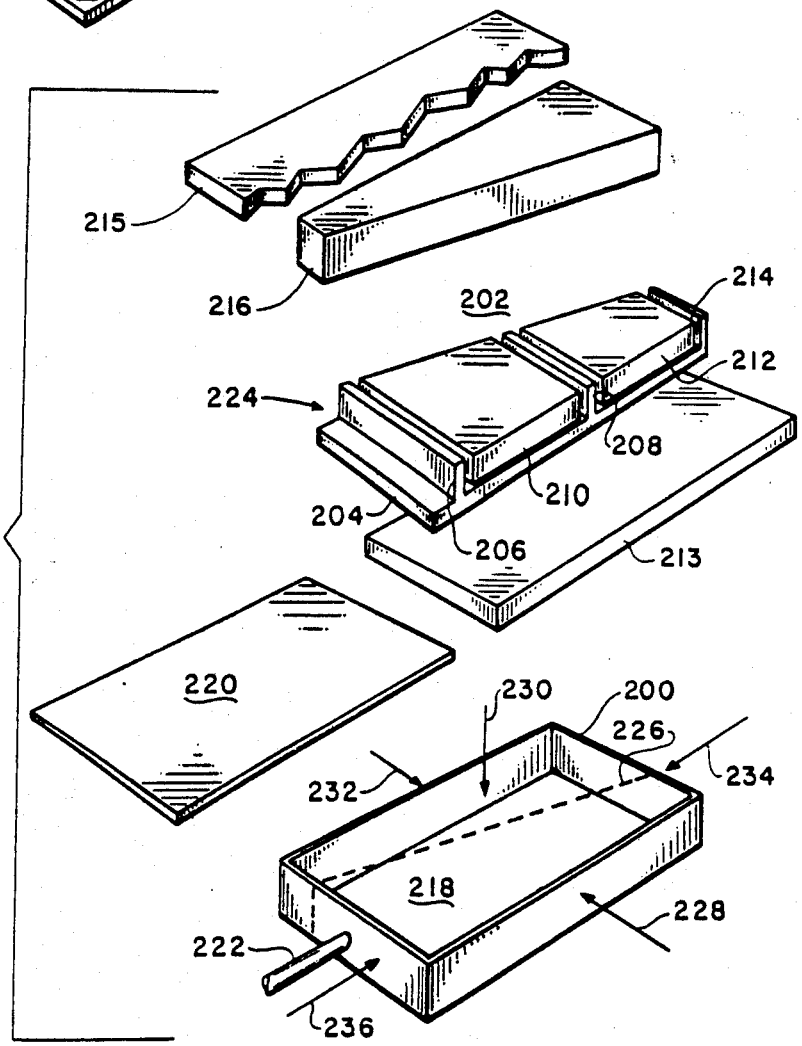
FIG. 2 is an exploded view showing the use of tooling spacer blocks in both locating the elements of a diffusion bonded assembly and in holding the diffusion bondable assembly in a closable high temperature retort.

FIG. 2 in the drawings shows several details concerning the achievement of diffusion bonds between elements of a workpiece fabricated from materials such as titanium. Shown in FIG. 2 are three tooling fixture spacer blocks 210, 212, and 216 used in the fabrication of a wedge-shaped finned workpiece 202 together with a symbolic representation of a high temperature controlled atmosphere chamber or retort 218, in which the diffusion bonding process occurs. The spacer block 210 in FIG. 2 may be the spacer block shown in exploded form in FIG. 1—with a reduced size and completed spacer block representation shown in FIG. 2. To achieve diffusion bonding in the FIG. 2 apparatus, the workpiece component elements 204, 206, 208, and 214 are located in desired relative position with respect to each other using the precisely shaped and dimensioned spacer blocks 210, 212, and 216 and an omitted spacer block in the space 224. The entire FIG. 2 assembly is positioned precisely and rigidly within the retort 218 for heating and performance of the bonding sequence. Each of the spacer blocks 210, 212, and 216 may of course, be of the low mass type described herein and shown in FIG. 1.

The dotted line 226 in FIG. 2 shows the boundary between the large wedge shaped spacer block 216 and the workpiece structure and smaller spacer block 210 and 212 in combination as this assembly is loaded into the retort 218. Prior to placing the workpiece and spacer block assembly in the retort 218, a force distributing pressure plate (not shown) and a heat conducting soak plate 213 are preferably located in the bottom of the retort and a similar soak plate 215 and pressure plate (not shown) are located above the workpiece and spacer block assembly prior to closing the retort with the sealing lid 220. During the diffusion bonding sequence, external force is applied to the retort and the spacer block and workpiece assembly to maintain the parts in desired relative contact and to urge the occurrence of diffusion bonding. These applied forces are indicated at 228, 230, 232, 234, and 236 in FIG. 2. Minor deformation of the retort structure of course, occurs with small dimensional changes in the diffusion bonded parts.

During accomplishment of diffusion bonding in the FIG. 2 apparatus, the exclusion of atmospheric oxygen and nitrogen is desirable for many diffusion bondable materials. Oxygen, for example, is known to produce undesirable embrittling of titanium at the 1650°-1700° F. diffusion bonding temperatures. The port 222 and if need be, a corresponding port on the opposite end of the retort 218 can be used to either evacuate the retort or supply a purging atmosphere of argon or other inert gases in the retort. The heat energy needed to raise the temperature of the FIG. 2 apparatus to the indicated diffusion bonding temperature range can be supplied from outside the retort 218 or alternately can be supplied by electrically energized coils of nichrome wire dispersed between the soak plates and pressure plates in the retort 218.

The spacer block 216 in FIG. 2 if fabricated in the heretofore accepted manner is an example of a block tending to promote non-uniform temperatures along portions of the diffusion bondable workpiece—by way of the largely varying cross-section and mass present along the block length. During heating or cooling of the FIG. 2 apparatus the temperature at the large end of the spacer block 216, if this block were fabricated from solid homogeneous material, would appreciably lag the temperature at the small end of the block. The prevention of undue temperature lag in spacer blocks of the configuration shown for the block 216 could of course, be achieved through the use of larger soak plate and pressure plate masses but can be especially aided through the use of the FIG. 1 type non-homogeneous or hollow lightweight spacer block structure.

The dimensional accuracy and stability needed in FIG. 1 type spacer block structures can be appreciated from the FIG. 2 representation of a diffusion bonding operation—by considering that in the FIG. 2 arrangement only the spacer blocks 210, 212, and 216 serve to hold the fin elements 206, 208 and 214 in the desired location during the diffusion bonding events and therefore determine the dimensions of the completed structure. Such factors as spacer block manufacturing tolerance, spacer block thermal expansion and workpiece dimensional changes during bonding clearly therefore require consideration in arranging the spacer block, workpiece and retort dimensions.

Additional details of a diffusion bonding operation and the use of FIG. 1 type spacer blocks in a diffusion bonding operation are shown in FIG. 3 of the drawings. In FIG. 3, a workpiece component element 300 is shown just prior to accomplishment of a diffusion bonding operation wherein the smaller workpiece component elements 302, 304 and 306 are to be bonded thereto at the interface areas 324, 326 and 328. For locating the smaller workpiece elements 302–306 during the heat and pressure portions of the diffusion bonding sequence, the spacer blocks 312, 314, 316, and 318 are employed. The spacer blocks 312–318 also serve to conduct force applied to the FIG. 3 assembly, that is, force represented by the arrow 332 and distributed by the pressure plates 310 and 308 to the workpieces and to the interface areas 324–328. The force indicated at 332 can originate in a hydraulic press, a screw thread arrangement, or with weights of large mass; preferably the force supplying arrangement should include some elasticity or means for maintaining the applied force in the presence of creep or small dimensional change occurring when the diffusion bonded elements are heated to the plastic state.

The rounded corners indicated at 322, the tapered clearance space 330, and the spacer block to workpiece separation indicated at 320 are also provided in response to dimensional changes expected in the workpieces 300–306 during the plastic state incurred in a diffusion bonding sequence. The rounded corners, indicated at 322 and shown on each of the spacer blocks 312–318, control the shape of a fillet formed at the junction of the small workpieces 302–306 and the large workpiece component element 300 during the plastic condition attending diffusion bonding. The presence of such fillets is desirable for relieving completed structure load induced stress concentrations as is known in the machine design and structural design arts. The tapered clearance space 330 and the resulting increased dimension between the small workpiece elements 302 and 304 at their topmost extremities provides clearance for removing the spacer blocks 312–318 after completion of the diffusion bonding sequence.

In the FIG. 3 diffusion bonding arrangement, the force applied to the bonding interface areas 324–328 is transmitted through the wing area portions 342 of the spacer blocks 312, 314, 316, and 318; such force transmission requires the structure of the spacer blocks 312–318 to be of sufficient rigidity and structural integrity, especially with respect to vertical or compressive loads, as to withstand the applied force without distortion or structural failure. A series of internal bracing members both within the wing portions 342 and within the body proper portions of the blocks 312–318 and in the nature of the support members 108 and 110 in FIG. 1 is therefore contemplated for use in the spacer blocks 312–318. One such support member 340, is shown in the cutaway portion 336 of the block 314 in FIG. 3. Also shown in the cutaway portion 336 is a cross-sectional view of the exterior surface material used for fabricating the spacer blocks 312–318. As suggested by this cross-section, the use of material considerably heavier than sheet stock is preferred for the spacer blocks.

As described in connection with the FIG. 1 apparatus, the use of stainless steel and welding are the preferred material and fabrication-integration techniques for the spacer blocks 312–318, assuming again the workpiece component elements are made of titanium material. A plurality of support members 340 may be located periodically throughout the length of the spacer blocks 312–318, that is, in the direction perpendicular to the FIG. 3 page, and spaced in accordance with force to be applied during the diffusion bonding sequence. The thickness and other structural properties of the support members 340 can also be arranged in accordance with the applied diffusion bonding force.

In FIG. 4 of the drawings there is shown a sandwich-like structure of the type described in the above referenced U.S. Pat. No. 3,533,153, and which may be fabricated using diffusion bonding techniques. The FIG. 4 sandwich-like structure 400 includes top and bottom cover members 412 and 414 which may be fabricated from heavy sheet like material along with a series of upstanding rib members 406, 408, 410 and so on, which define a series of cavities 402, and 404 lying between the top and bottom cover members 412 and 414. At 426 in FIG. 4 is shown a cutaway view of a spacer block made in accordance with the present invention which might be used in fabricating the FIG. 4 structure from a plurality of structural elements by using a diffusion bonding sequence. The spacer block 426 is shown cut away at 416 and 424 to reveal the use of heavy stock material in forming side members 418 and 419, support members 420 and 422 and the spacer block top 430.

In fabricating a structure of the type shown at 400 in FIG. 4 using spacer blocks and diffusion bonding techniques, some consideration of the necessity for withdrawing the spacer blocks 426 after completion of the diffusion bonding operation is required. One aid in accomplishing this withdrawing includes fabricating the structure 400 such that one end of the spacer block 426, for example, the end forming the portion of the sandwich-like structure indicated at 407 is smaller in dimensions than is the end 406. Such differences in spacer block and finished structure dimensions allow removal clearance for the spacer block from a completed structure and are therefore desirable where acceptable in the completed workpiece structure dimensions. Other techniques for removing spacer blocks from completed diffusion bonded structures include of course, pushing and pulling on spacer block exposed surfaces 428 and the like, the use of dimensional changing apparatus within the spacer block and, of course, distortion of the completed diffusion bonded structure with externally applied force in order to achieve spacer block removal. The importance of preventing oil-canning or other forms of structural deflection in the spacer blocks during bonding can be appreciated by considering the difficulty of removing spacer blocks of the type shown at 426 in the event such interlocking distortions of the spacer block and workpiece structure have occurred.

The diffusion bonding spacer blocks described herein are variously called tooling fixtures, filler blocks, and mandrels. These spacer blocks can be understood to provide the capability for decreasing the weight mass and thermal mass of diffusion bonding tooling as well as decreasing the cost of fabricating such tooling through allowing use of fabricated or built-up spacer block devices in lieu of the cast or machined blocks which are otherwise necessary. The described spacer blocks can also be used for purposes other than diffusion bonding, including the fabrication of plastic materials, adhesive integrated structures, and other uses. Further examples showing the use of spacer blocks and alternate types of workpiece structures which can be fabricated from these blocks is shown in the above referenced U.S. Pat. No. 3,533,156. In all such structures, use of the herein described spacer blocks is of course, desired in preference to the different types of block previously used. The herein described spacer blocks in addition to the other recited advantages often enable hand or manual placement of spacer blocks in a to-be-bonded assembly in lieu of slower and more costly machine aided placement necessary with solid homogeneous spacer blocks.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. Apparatus for performing diffusion bond integration of positioned individual component elements into a one-piece integral structure comprising:

multiple faced, hollow centered, low mass metal tooling means intimately surroundable by a plurality of said individual component elements, one on each tooling means face save at least one face, for retaining said individual component elements in fixed predetermined positional relationship during an element integrating diffusion bond sequence, the metal material of said tooling means having a plastic flow temperature range above that of said component elements, with said tooling means including internal metallic elongated thin structural members joining the interior surfaces of three of said multiple faces;

closable retort means for receiving and holding said component elements and said tooling means fixed in an assembled predetermined relationship during a diffusion bond sequence;

gaseous atmosphere control means connected with said retort means for displacing air therefrom during a closed retort diffusion bond sequence;

heating means for raising the temperature of said positioned component elements in said retort means to a predetermined temperature within the plastic flow range of said component element material; and force generating means for urging said individual component elements into pressured intimate contact with adjacent component elements and with said tooling means during said diffusion bond sequence.

2. The apparatus of claim 1 wherein said component elements are composed of titanium and said tooling means comprises tooling mandrel spacer blocks composed of stainless steel.

3. The apparatus of claim 2 wherein said stainless steel is twenty-two, four, nine stainless steel.

4. The apparatus of claim 3 further including heat conducting soak plate means located external of said pressure plate means in said retort for distributing heat energy uniformly over said component elements, tooling means and soak plate means.

5. The apparatus of claim 2 wherein said atmosphere control means includes a supply of noble gas.

6. The apparatus of claim 2 wherein said noble gas is argon.

7. The apparatus of claim 2 wherein said atmosphere control means includes a source of vacuum.

8. Diffusion bond tooling for holding intersecting planar surfaced workpiece component elements in predetermined integrated workpiece forming juxtapose in the presence of workpiece component element integrating bonding heat and force comprising:

a plurality of metallic tool element planar members of predetermined size and shape disposed in polyhedral relationship about a hollow interior tool element cavity;

means connecting said tool element planar members into a substantially closed integral geometric polyhedron; and elongated metallic element support means located within said tool element hollow interior cavity and connected in support of at least three of said tool element planar members for resisting distortion of said polyhedron by said bonding heat and force.

9. The apparatus of claim 8 wherein said integral geometric polyhedron comprises an elongated shape having first and second end portions and wherein said second end portion is of smaller circumferential dimensions than said first end portion;

whereby withdrawal of said elongated polyhedron in first end first sequence from a captured position within a bonded component element integral structure is enabled.

10. The apparatus of claim 8 wherein said means connecting said tool element planar members includes welded metal.

11. The apparatus of claim 10 wherein said first metal is titanium and said second metal is twenty-two, four, nine stainless steel.

12. The apparatus of claim 11 wherein said polyhedron has six sides.

13. A lightweight low thermal mass mandrel for holding diffusion bondable component parts in predetermined alignement relationship during a time prolonged diffusion bonding thermal process comprising:

a vertical standing closed periphery metallic frame member disposed laterally along a horizontal plane and defining a circumferentially bounded interior cavity;

planar metallic bottom cover plate means laterally bounded by said metallic frame member, disposed along said horizontal plane, and connected with the lower periphery of said vertical standing frame member, for closing an open lower port of said interior cavity;

planar metallic top cover plate means laterally bounded by said metallic frame member, disposed opposite said bottom cover plate means and connected with the upper periphery of said vertical standing frame member for closing an open upper port, and thereby completing closure of said interior cavity; and elongated metallic upstanding means within said interior cavity extending between said cover plate means and said periphery metallic frame member for supporting said cover plate means in the presence of diffusion bond promoting forces applied to said component parts.

14. The apparatus of claim 13 wherein said means within said interior cavity also extends between sides of said closed periphery frame member.

* * * * *